United States Patent [19]

Vives

[11] Patent Number: 5,183,844
[45] Date of Patent: Feb. 2, 1993

[54] POLY(ARYLENE SULFIDE) COMPOSITION AND METHOD USING SILICA TO REDUCE DROOL

[75] Inventor: Van C. Vives, Bartlesville, Okla.

[73] Assignee: Phillips Petroleum Company, Bartlesville, Okla.

[21] Appl. No.: 548,277

[22] Filed: Jul. 2, 1990

[51] Int. Cl.$^5$ ................................................ C08K 3/36
[52] U.S. Cl. .................... 524/423; 524/425; 524/451; 524/609; 524/424; 524/495
[58] Field of Search ............ 524/423, 425, 451, 609, 524/495

[56] References Cited

U.S. PATENT DOCUMENTS

| | | | |
|---|---|---|---|
| 3,354,129 | 11/1967 | Edmonds, Jr. et al. | 260/79 |
| 3,856,735 | 12/1974 | Blackwell | 260/29.6 F |
| 3,919,177 | 11/1975 | Campbell | 260/79.1 |
| 4,337,182 | 6/1982 | Needham | 524/609 |
| 4,436,865 | 3/1984 | Beever | 524/504 |
| 4,451,601 | 5/1984 | Blackwell | 524/263 |
| 4,474,921 | 10/1984 | Dix | 524/423 |
| 4,504,551 | 3/1985 | Leland | 428/419 |
| 4,514,588 | 4/1985 | Beever et al. | 174/52 PE |

Primary Examiner—John C. Bleutge
Assistant Examiner—Mark Sweet
Attorney, Agent, or Firm—Laney, Dougherty, Hessin & Beavers

[57] ABSTRACT

A composition comprises poly(arylene sulfide), fiberglass, an additive containing an element selected from among the group consisting of alkaline earth metals, magnesium and beryllium; and silica present in an amount sufficient to increase the shear sensitivity of the composition so that the composition does not drool during molding. A method for providing a composition having reduced drool during molding comprises admixing with a composition containing poly(arylene sulfide) and fiberglass an amount of silica sufficient to increase shear sensitivity of the composition so that the composition has reduced drool during molding.

12 Claims, No Drawings

POLY(ARYLENE SULFIDE) COMPOSITION AND METHOD USING SILICA TO REDUCE DROOL

BACKGROUND OF THE INVENTION

This invention relates generally to using silica in poly(arylene sulfide) compositions to reduce drool. This invention relates more particularly, but not by way of limitation, to using a limited quantity of high surface silica in a highly mineral filled poly(phenylene sulfide)/fiberglass composition to improve shear sensitivity of the composition so that it does not drool when injection molded.

Injection molding is a process by which molded shapes are made by injecting a measured quantity of molten material into a die. Undesired molding can occur if the molten material continues to flow even after the inlet flow has been shut off. An unwanted amount of this continued flow is called drool. One way to stop drool is to use shut off nozzles, but not all molding processes use these; therefore, there is the need for an improved material which flows adequately to be injection molded, but which does not continue to flow adversely (i.e., drool) after molding pressure has been released.

Various types of materials can be injection molded. One type is a thermoplastic composition containing arylene sulfide polymer [referred to as poly(arylene sulfide)]. A particularly useful species of poly(arylene sulfide) is poly(phenylene sulfide). A specific poly(phenylene sulfide) composition which can drool when injection molded comprises about 35 percent by weight Ryton ® PR07 poly(phenylene sulfide), about 35 percent by weight fiberglass, about 28.75 percent by weight talc or calcium carbonate, about 1 percent by weight lithium carbonate and about 0.25 percent by weight polyethylene. Another specific poly(phenylene sulfide) composition which can drool when injection molded comprises about 38 percent by weight Ryton ® PR07 poly(phenylene sulfide), about 35 percent by weight fiberglass, about 25.75 percent by weight calcium sulfate, about 1 percent by weight lithium carbonate and about 0.25 percent by weight polyethylene.

Because injection molded thermoplastic products containing poly(arylene sulfide) have a wide range of uses, it would be desirable to provide poly(arylene sulfide) compositions which do not drool when injection molded. More specifically, it would be desirable to provide modified versions of the aforementioned poly(phenylene sulfide) compositions which do not drool when injection molded.

SUMMARY OF THE INVENTION

The present invention overcomes the above-noted and other shortcomings of the prior art by providing a novel and improved composition and method for providing a composition which has reduced drool during injection molding. With regard to the aforementioned highly mineral filled poly(phenylene sulfide) injection molding compositions, a part of the composition (for example, the mineral filler) is replaced with silica, preferably high surface silica, to improve the shear sensitivity of the composition and thereby reduce drool.

The composition of the present invention comprises poly(arylene sulfide); fiberglass; an additive containing an element selected from among the group consisting of alkaline earth metals, magnesium and beryllium; and silica present in an amount sufficient to increase the shear sensitivity of the composition so that the composition does not drool during molding.

In a preferred embodiment, the present invention provides a composition consisting of poly(arylene sulfide); fiberglass; silica; at least one first additive selected from among the group consisting of calcium carbonate, calcium sulfate and talc; and at least one second additive selected from among the group consisting of polyethylene and an acid scavenger (such as lithium carbonate, magnesium carbonate, or calcium carbonate, if not present as one of the primary additives or fillers); wherein said silica is present in an amount ranging from about 4 to about 15 percent by weight.

The present invention also includes a method for providing a composition, containing poly(arylene sulfide) and fiberglass as reinforcing agent, which has reduced drool during molding. The method comprises admixing with the composition an amount of silica sufficient to increase shear sensitivity of the composition so that the composition has reduced drool during molding.

Therefore, from the foregoing, it is a general object of the present invention to provide a novel and improved poly(arylene sulfide) composition and method using silica to reduce drool. Other and further objects, features and advantages of the present invention will be readily apparent to those skilled in the art upon a reading of the description of the preferred embodiments which follows.

DETAILED DESCRIPTION OF PREFERRED EMBODIMENTS

A modified highly mineral filled poly(arylene sulfide) injection molding compound is provided, wherein part of the composition, such as the mineral content, is replaced with silica to achieve more shear sensitivity so that the composition has high flow rates at high shear rates created when injection molding pressure is applied and so that the composition has low flow rates at low shear rates when injection molding pressure is reduced (and, ideally, no flow rate at zero shear rate when injection molding pressure is released). This yields a composition which exhibits no or reduced drool during injection molding.

The composition of the present invention comprises poly(arylene sulfide) having a melt flow rate ranging from about 50 to about 3000 grams per ten minutes. The poly(arylene sulfide) is preferably poly(phenylene sulfide) having a melt flow rate ranging from about 500 to about 2000 grams per ten minutes. An example of a specific poly(phenylene sulfide) is Ryton ® PR07 type poly(phenylene sulfide) from Phillips Chemical Company. The production of arylene sulfide polymers is disclosed in, for example, U.S. Pat. No. 3,354,129 to Edwards, Jr. et al. and U.S. Pat. No. 3,919,177 to Campbell. See also U.S. Pat. No. 4,474,921 to Dix. These patents are incorporated herein by reference.

The composition further comprises a known type of fiberglass used as a reinforcing agent. An example of a suitable fiberglass is Owens-Corning 197 B chopped strand glass fiber.

The composition also comprises a mineral filler additive containing an element selected from among the group consisting of alkaline earth metals (calcium, strontium, barium, radium), magnesium and beryllium, and more preferably from among the group consisting of calcium and magnesium. This additive is a mineral filler used for decreasing cost while still achieving necessary mechanical strength. Examples of suitable specific fillers include calcium carbonate, calcium sulfate and talc.

The composition further comprises silica present in an amount sufficient to increase the shear sensitivity of the composition so that the composition does not drool during molding. Preferably the silica is high surface silica such as Aerosil 200, an amorphous fumed silica from Degussa Corp., or Tullanox 500, an amorphous fumed silica with a surface area of 225 meter$^2$/gram from Tulco, Inc. "High surface silica" is typically formed from a fumed silica base. An example of a suitable range of surface areas is between about 50 and about 400 meter$^2$/gram. An example of an unsuitable range is between 1–2 meter$^2$/gram. A low surface area silica which was tested and found inadequate for purposes of the present invention is Fillite PFA (solid alumina silica spheres 10–20 micron particle size, from Fillite U.S.A., Inc.).

Preferred embodiments of the composition of the present invention further comprise at least one other additive selected from among the group consisting of polyethylene and an acid scavenger, such as lithium carbonate, magnesium carbonate, or calcium carbonate, if not present as one of the primary additives or fillers. An example of one such additive is polyethylene, such as Marlex ® TR-885 from Phillips Chemical Company, which is used as a mold release agent. An example of another such additive is lithium carbonate which is used as a mold corrosion inhibitor.

Preferred embodiments of the composition of the present invention have the silica present in an amount ranging from about 2 to about 15 percent by weight of the total composition position (all percent by weight values given herein and in claims are relative to the total composition weight), and more preferably from about 4.0 to about 7.2 percent by weight. The higher end of the broader range contemplates compositions with relatively less mineral filler and more poly(arylene sulfide) or compositions using higher flow rate poly(arylene sulfide) feedstock. More generally, the minimum amount of silica that will be needed, and the maximum amount that can be tolerated and still have sufficient flow at melt temperature will depend upon the flow rate of the poly(arylene sulfide) feedstock resin used and upon the concentration of the other additives and fillers.

For the composition having the preferred range of silica, the poly(arylene sulfide) is present in an amount ranging from about 30 to about 65 percent by weight, the fiberglass is present in an amount ranging from about 5 to about 50 percent by weight, the mineral filler additive is present in an amount ranging from about 2 to about 58 percent by weight, and the at least one other additive has a total presence in an amount of about 1.25 percent by weight. For a composition limited to the more preferred amount of silica, the same ranges of poly(arylene sulfide), fiberglass and the at least one other additive are the same, but the mineral filler additive is present in an amount ranging from about 2 to about 56.0 percent by weight.

Preferred embodiments of the composition of the present invention are modifications of Ryton ® R-7 and R-10 poly(phenylene sulfide) compositions from Phillips Chemical Company. The unmodified Ryton ® R-7 composition includes 38 percent by weight Ryton ® PR07 type poly(phenylene sulfide), 35 percent by weight fiberglass, 25.75 percent by weight calcium sulfate, 1 percent by weight lithium carbonate and 0.25 percent by weight polyethylene. The basic Ryton ® R-10 composition includes 35 percent by weight Ryton ® PR07 type poly(phenylene sulfide), 35 percent by weight fiberglass, 28.75 percent by weight calcium carbonate or talc (including pigments depending upon color), 1 percent by weight lithium carbonate and 0.25 percent by weight polyethylene. Both of these basic R-7 and R-10 compositions are subject to some drool when injection molded. To produce more drool-resistant compositions, these basic formulations are modified by replacing part of the composition (specifically, either the poly(phenylene sulfide) or the mineral filler in the preferred embodiments) with silica, preferably in the amounts described hereinabove.

For a composition of the present invention including silica in an amount ranging from about 2 to about 15 percent by weight and particularly related to the desired modifications of the R-7 and R-10 compositions, the composition further comprises poly(phenylene sulfide) in an amount ranging from about 35 to about 38 percent by weight, fiberglass in an amount of about 35 percent by weight, the mineral filler additive in an amount ranging from about 10.75 to about 26.75 percent by weight, lithium carbonate in an amount of about 1 percent by weight, and polyethylene in an amount of about 0.25 percent by weight. For such composition containing silica limited to an amount ranging from about 4.0 to about 7.2 percent by weight, the composition further comprises poly(phenylene sulfide) in an amount ranging from about 35 to about 38 percent by weight, fiberglass in an amount of about 35 percent by weight, the mineral filler additive in an amount ranging from about 18.55 to about 24.75 percent by weight, lithium carbonate in an amount of about 1 percent by weight, and polyethylene in an amount of about 0.25 percent by weight.

The present invention also includes a method for providing a composition, containing poly(arylene sulfide) and fiberglass as reinforcing agent, which has reduced drool during molding. This method comprises admixing with the composition an amount of silica sufficient to increase shear sensitivity of the composition so that the composition has reduced drool during molding. As previously described, silica is preferably present in an amount ranging from about 2 to about 15 percent by weight and more preferably from about 4.0 to about 7.2 percent by weight. The other components of the composition are preferably in the amounts described hereinabove, and the poly(arylene sulfide) is preferably of the type having a melt flow rate ranging from about 50 to about 3000 grams per ten minutes. The poly(arylene sulfide) is preferably poly(phenylene sulfide) having a melt flow rate ranging from about 500 to about 2000 grams per ten minutes.

More particularly, the present invention provides a method for modifying a composition, consisting of poly(phenylene sulfide), fiberglass, polyethylene, lithium carbonate and an additive selected from among the group consisting of calcium carbonate, calcium sulfate and talc, so that the modified composition has increased shear sensitivity for reducing drool during molding. The composition preferably consists of poly(phenylene sulfide) present in an amount ranging from about 35 to about 38 percent by weight, fiberglass present in an amount of about 35 percent by weight, polyethylene present in an amount of about 0.25 percent by weight, lithium carbonate present in an amount of about 1 percent by weight and the selected additive present in an amount ranging from about 10.75 to about 26.75 percent by weight. The method comprises admixing with this composition an amount of silica sufficient to increase shear sensitivity of the composition so that the composition has reduced drool during molding. The silica preferably is present in an amount within the ranges for silica described hereinabove.

Samples of various compositions have been made and tested for flow rate at various loadings. This testing was used to check for materials with more shear sensitivity so that there is adequate flow at high shear rates and low flow at low shear rates. Flow rates were determined with an extrusion plastometer as specified in ASTM D 1238 at a melt temperature of 315° C. The following loadings were used 9892 grams, 7393 grams, 5000 grams and 2470 grams. The plot of (ln flow rate) vs. (ln load) is essentially a straight line; therefore, the slope was determined, with an increase in slope denoting an increase in shear sensitivity. The percent decrease in flow rate from high to low loading might also be an indication of change in shear sensitivity. The following table summarizes these tests.

| Example | Composition | Slope | % Flow Rate Change | 5 kg Flow Rate |
|---|---|---|---|---|
| I | Ryton ® R-7 PPS | 1.20 | 83 | 102 |
| II | Ryton ® R-7 PPS modified w/4% Aerosil 200 | 3.35 | 100 | 26 |
| III | Ryton ® R-10 PPS | 1.31 | 84 | 51 |
| IV | Ryton ® R-10 PPS modified w/2.9% Aerosil 200 | 1.40 | 86 | 59 |
| V | Ryton ® R-10 PPS modified w/3.4% Aerosil 200 | 1.37 | 85 | 64 |
| VI | Ryton ® R-10 PPS modified w/4.3% Aerosil 200 | 2.38 | 96 | 28 |
| VII | Ryton ® R-10 PPS modified w/4.3% Tullanox 500 | 2.11 | 95 | 25 |
| VIII | Ryton ® R-10 PPS modified w/7.2% Fillite PFA | 1.24 | 83 | 76 |

My analysis of the foregoing table indicates that in R-7 and R-10 type compounds, at least about 4 percent by weight silica is required to substantially increase the shear sensitivity (see slope). Although not shown in the table, an R-10 compound with 7.2 percent silica has a 0 flow rate, indicating that the concentration of silica is too high for this compound.

The compositions of the examples listed in the foregoing table are described as follows.

EXAMPLE I

A control sample of Ryton ® R-7 PPS of 76.0 grams PR07 poly(phenylene sulfide) (PPS) from Phillips Chemical Company, 70.0 grams fiberglass, 51.5 grams calcium sulfate (CA5), 0.5 grams polyethylene (Marlex ® TR-885) and 2.0 grams lithium carbonate was prepared by dry mixing the ingredients and extruding three times in an NRM Corp. (1-inch) extruder with samples being chopped using a 5 millimeter screen between each pass through the extruder.

EXAMPLE II

A composition was prepared in the same manner as described in Example I except comprising 68.0 grams Ryton ® PR07 PPS, 8.0 grams silica (Aerosil 200), 70.0 grams fiberglass, 51.5 grams calcium sulfate (CA5), 0.5 grams polyethylene (Marlex ® TR-885) and 2.0 grams lithium carbonate.

EXAMPLE III

A control sample of Ryton ® R-10 PPS was prepared by dry mixing all ingredients and extruding three times in an NRM Corp. (1-inch) extruder with samples being chopped using a 5 millimeter screen between each pass through the extruder. The composition comprised 70.0 grams Ryton ® PR07 PPS, 57.5 grams calcium carbonate, 70.0 grams fiberglass, 0.5 grams polyethylene (Marlex ® TR-885) and 2.0 grams lithium carbonate.

EXAMPLE IV

A composition was prepared in accordance with Example III The composition comprised 70.0 grams Ryton ® PR07 PPS, 5.8 grams silica (Aerosil 200), 51.7 grams calcium carbonate, 70.0 grams fiberglass, 0.5 grams polyethylene (Marlex ® TR-885) and 2.0 grams lithium carbonate.

EXAMPLE V

A composition was mixed and extruded three times through a one inch extruder, grinding after each extrusion in a small Wiley mill using a 5mm screen. The extruder temperature die was at 300° C. and the barrel was 325° C. The composition comprised 70.0 grams Ryton ® PR07 PPS, 6.9 grams silica (Aerosil 200), 50.6 grams calcium carbonate, 70 grams fiberglass, 0.5 grams polyethylene (Marlex ® TR-885) and 2.0 grams lithium carbonate.

EXAMPLE VI

A composition was prepared according to Example V. The composition comprised 70.0 grams Ryton ® PR07 PPS, 8.6 grams silica (Aerosil 200), 48.9 grams calcium carbonate, 70.0 grams fiberglass, 0.5 grams polyethylene (Marlex ® TR-885) and 2.0 grams lithium carbonate.

EXAMPLE VII

A composition was prepared according to Example V. The composition comprised 70.0 grams Ryton ® PR07 PPS, 8.6 grams silica (Tullanox 500), 48.9 grams calcium carbonate, 70.0 grams fiberglass, 0.5 grams polyethylene (Marlex ® TR-885) and 2.0 grams lithium carbonate.

EXAMPLE VIII

A composition was prepared according to Example V. The composition comprised 70.0 grams Ryton ® PR07 PPS, 14.4 grams silica (Fillite PFA), 43.1 grams calcium carbonate, 70.0 grams fiberglass, 0.5 grams polyethylene (Marlex ® TR-885) and 2.5 grams lithium carbonate.

EXAMPLE IX

A composition was prepared according to Example III. The composition comprised 70.0 grams Ryton ® PR07 PPS, 14.4 grams silica (Aerosil 200), 43.1 grams calcium carbonate, 70.0 grams fiberglass, 0.5 grams polyethylene (Marlex ® TR-885) and 2.0 grams lithium carbonate. For this composition no flow occurred at a load of 7393 grams, thereby indicating that a smaller concentration of the silica was needed.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A composition having improved shear sensitivity comprising: poly(phenylene sulfide) in an amount in the range of from about 30% to about 65% by weight based on the total of said composition; fiberglass in an amount in the range of from about 5% to about 50% by weight based on the total weight of said composition; an additive selected from the group consisting of calcium carbonate, calcium sulfate, and talc, said additive being present in said composition in an amount in the range of from about 2% to about 58% by weight based on the total weight of said composition; and silica in an amount in the range of from about 4% to about 7.2% by weight based on the total weight of said composition, wherein said silica is a high surface silica having a surface area in the range of from about 50 to about 400 $m^2/g$.

2. A composition as described in claim 1 further comprising lithium carbonate and polyethylene.

3. A composition as described in claim 2 wherein: said poly(phenylene sulfide) is present in said composition in an amount in the range of from about 35% to about 38% by weight based on the total weight of said composition; said fiberglass is present in said composition in an amount of about 35% by weight based on the total weight of said composition; and said additive is present in said composition in an amount in the range of from about 10.75% to about 26.75% by weight based on the total weight of said composition.

4. A composition as described in claim 3 wherein said lithium carbonate is present in said composition in an amount of about 1% by weight based on the total weight of said composition and said polyethylene is present in said composition in an amount of about 0.25% by weight based on the total weight of said composition.

5. A composition as described in claim 4 wherein: said additive is calcium carbonate; said additive is present in composition in an amount of about 24.45% by weight based on the total weight of said composition; and said poly(phenylene sulfide) is present in said composition in an amount of about 35% by weight based on the total weight of said composition.

6. A composition having improved shear sensitivity comprising: about 68 parts by weight poly(phenylene sulfide); about 8 parts by weight silica; about 70 parts by weight fiberglass; about 51.5 parts by weight calcium sulfate; about 0.5 parts by weight polyethylene; and about 2 parts by weight lithium carbonate, wherein said silica is a high surface silica having a surface area in the range of from about 50 to about 400 $m^2/g$.

7. A method of increasing the shear sensitivity of a poly(phenylene sulfide) composition, said composition comprising from about 30 to about 65 parts by weight poly(phenylene sulfide), from about 5 to about 50 parts by weight fiberglass, and from about 2 to about 58 parts by weight of an additive selected from the group consisting of calcium carbonate, calcium sulfate, and talc, said method comprising the step of admixing with said composition an amount of silica in the range of from about 4 to about 7.2 parts by weight, said silica being a high surface silica having a surface area in the range of from about 50 to about 400 $m^2/g$.

8. A method as described in claim 7 wherein said composition further comprises lithium carbonate and polyethylene.

9. A method as described in claim 8 wherein: said poly(phenylene sulfide) is present in said composition in an amount in the range of from about 35 to about 38 parts by weight; said fiberglass is present in said composition in an amount of about 35 parts by weight; and said additive is present in said composition in an amount in the range of from about 10.75 to about 26.75 parts by weight.

10. A method as described in claim 9 wherein said lithium carbonate is present i said composition in an amount of about 1 part by weight and said polyethylene is present in said composition in an amount of about 0.25 parts by weight.

11. A method as described in claim 10 wherein: said additive is calcium carbonate; said additive is present in said composition in an amount of about 24.45 parts by weight; and said poly(phenylene sulfide) is present in said composition in an amount of about 35 parts by weight.

12. A method of increasing the shear sensitivity of a poly(phenylene sulfide) composition, said composition comprising about 68 parts by weight poly(phenylene sulfide), about 70 parts by weight fiberglass, about 51.5 parts by weight calcium sulfate, about 0.5 parts by weight polyethylene, and about 2 parts by weight lithium carbonate, said method comprising the step of admixing with said composition about 4 parts by weight silica, said silica being a high surface silica having a surface area in the range of from about 50 to about 400 $m^2/g$.

* * * * *